(12) United States Patent
Jones et al.

(10) Patent No.: US 8,171,557 B2
(45) Date of Patent: *May 1, 2012

(54) DOCUMENT ACCESSING THROUGH MULTIPLE SECURITY DOMAINS

(75) Inventors: M. Isaac Jones, Portland, OR (US); Dylan McNamee, Portland, OR (US)

(73) Assignee: Galois, Inc., Portland, OR (US)

( * ) Notice: Subject to any disclaimer, the term of this patent is extended or adjusted under 35 U.S.C. 154(b) by 1138 days.

This patent is subject to a terminal disclaimer.

(21) Appl. No.: 11/750,297

(22) Filed: May 17, 2007

(65) Prior Publication Data

US 2007/0282752 A1 Dec. 6, 2007

Related U.S. Application Data

(60) Provisional application No. 60/747,523, filed on May 17, 2006.

(51) Int. Cl.
*G06F 7/04* (2006.01)

(52) U.S. Cl. 726/26; 707/1; 707/999.001; 707/999.009; 705/7; 705/57; 726/3; 726/27; 726/28; 726/29; 726/30

(58) Field of Classification Search .................. 726/26; 707/1, 999.001, 999.009; 705/7
See application file for complete search history.

(56) References Cited

U.S. PATENT DOCUMENTS

| | | | |
|---|---|---|---|
| 5,550,968 A * | 8/1996 | Miller et al. | 715/741 |
| 5,878,418 A | 3/1999 | Polcyn et al. | |
| 6,567,918 B1 * | 5/2003 | Flynn et al. | 726/7 |
| 6,889,210 B1 * | 5/2005 | Vainstein | 705/57 |
| 6,952,778 B1 | 10/2005 | Snyder | |
| 2002/0107710 A1 | 8/2002 | Takizawa et al. | |
| 2002/0138377 A1 | 9/2002 | Weber | |
| 2003/0196108 A1 * | 10/2003 | Kung | 713/200 |
| 2005/0063365 A1 | 3/2005 | Mathew | |
| 2005/0071194 A1 * | 3/2005 | Bormann et al. | 705/2 |
| 2005/0091515 A1 * | 4/2005 | Roddy et al. | 713/188 |
| 2005/0120289 A1 | 6/2005 | Suzuki | |
| 2005/0246423 A1 * | 11/2005 | Starbuck et al. | 709/206 |

(Continued)

OTHER PUBLICATIONS

JG Lee et al "The dynamic predicate: integrating access control with query processing in XML databases". VLDB Journal, vol. 16, No. 3, pp. 371-387. Springer-Verlag.*

(Continued)

*Primary Examiner* — Taghi Arani
*Assistant Examiner* — Jason Lee
(74) *Attorney, Agent, or Firm* — Schwabe Williamson & Wyatt

(57) ABSTRACT

Methods and apparatuses for accessing documents in a multi-security domain environment are described herein. The novel methods may be processor implemented methods and may include saving by a processor from a first to a second security domain a version of a document, wherein the first security is a higher security domain than the second security domain. As part of the saving operation, a determination may be made as to whether the document includes one or more components not to be accessible through the second security domain, and writing the components of the document excluding the one or more components determined not to be accessible through the second security domain into the second security domain. The methods may further include opening the document through the security domain by determining whether a version of the document has been saved to the second security domain, and if so, merging a copy of modifications made to version of the document, if there are any, into the document being open. In various embodiments, a domain specific document server and a cross security domain trusted services are employed to enable among other things, reduction of number of storage devices needed.

24 Claims, 9 Drawing Sheets

U.S. PATENT DOCUMENTS

| | | | |
|---|---|---|---|
| 2006/0218637 A1* | 9/2006 | Thomas et al. | 726/23 |
| 2007/0050708 A1* | 3/2007 | Gupta et al. | 715/513 |
| 2007/0061158 A1* | 3/2007 | Fry et al. | 705/1 |
| 2007/0260648 A1* | 11/2007 | Friesenhahn et al. | 707/203 |
| 2007/0263012 A1* | 11/2007 | Panditharadhya et al. | 345/629 |
| 2008/0052514 A1* | 2/2008 | Nakae | 713/168 |
| 2010/0242087 A1* | 9/2010 | Matsumoto | 726/3 |

OTHER PUBLICATIONS

Office Action in U.S. Appl. No. 11/750,268 dated Aug. 2, 2010.
Office Action in U.S. Appl. No. 11/750,268 dated Apr. 11, 2011.
Final Office Action in U.S. Appl. No. 11/750,268 dated Sep. 14, 2011.

* cited by examiner

50

FIG. 8
Security Domain
High (H) 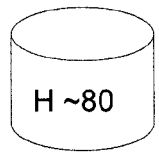 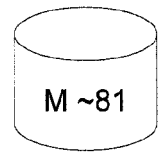 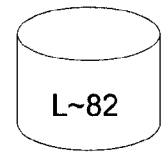 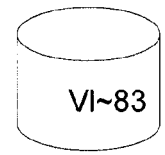
Medium (M) 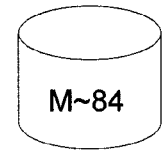 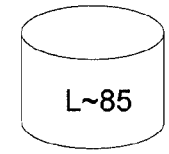 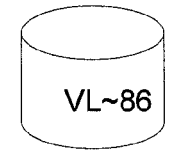
Low (L) 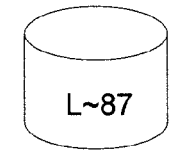 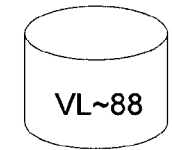
Ver low (VL) 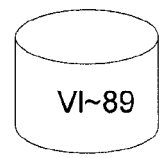
10 total storage devices needed FIG. 9
Security Domain
High (H)   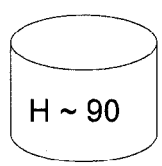
H ~ 90
- - - - - - - - - - - - - - - - - - - - - - - - - - - - - - - - - - - - -
Medium (M)   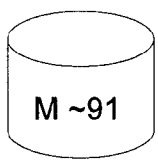 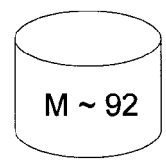
M ~91    M ~ 92
- - - - - - - - - - - - - - - - - - - - - - - - - - - - - - - - - - - - -
Low (L)   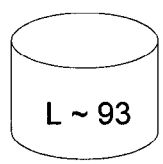 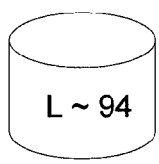
L ~ 93    L ~ 94
- - - - - - - - - - - - - - - - - - - - - - - - - - - - - - - - - - - - -
Ver low (VL)   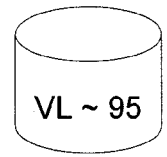 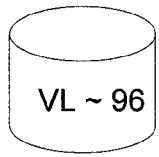
VL ~ 95    VL ~ 96
7 databases required

DOCUMENT ACCESSING THROUGH MULTIPLE SECURITY DOMAINS

CROSS REFERENCE TO RELATED APPLICATIONS

The present application claims priority to U.S. Provisional Patent Application No. 60/747,523 filed May 17, 2006 entitled, "METHOD AND APPARATUS FOR PROVIDING READ-WRITE COLLABORATION WITHIN A MULTI-LEVEL SECURE DOCUMENT."

TECHNICAL FIELD

Embodiments of the present invention relate to the field of data processing, more specifically, to methods and apparatuses for managing electronic documents between multiple security domains.

BACKGROUND

It is increasingly common for computer users to collaborate with other computer users outside their administrative levels such as outside their own office, department, corporation, communication network, and so forth. In each of these cases, collaboration between users span multiple administrative security levels. One example of such collaboration is in manufacturing "supply chains," which comprise the often complex chains of supplier/consumer relationships that culminate in the production of a manufactured good, and documents may be shared between members of such supply chains. Another example is when patient records are shared between medical service providers and insurance companies. Another example is wiki webpages jointly edited by multiple users. Still another example is from the Defense or Intelligence communities, in which users may be assigned to different "security levels," and all documents produced by a user associated with a particular security level may need to be able to store such documents at the security level of the user. Such a user may also need to be able to access, at least to a certain degree, documents or at least copies of documents produced by users belonging to other security level in order for all of the users to seamlessly collaborate with each other without violating the different administrative security levels.

In these situations, collaboration between users associated with different security levels may consist of viewing and/or editing of documents or copies of such documents produced by users belonging to the different security level. These documents may be, for example, word processing documents, image files, video, audio presentations, web pages, website structures, and so forth.

Current support for enabling collaboration across security levels is limited to transmitting a copy of a document to be shared properly "cleansed" between different security levels from one side to the other (i.e., from one security level to another security level). If users of either side need to make proprietary (or secret) modifications to the document, they need to keep a copy of the document with the modifications private, and only transmit a version of the document having only information the transmitting party is willing to share with the receiving party. For example, a higher security level user has to take overt actions to remove, delete or otherwise shield the changes made to a document through a higher security level that are not to be shared with users of a lower security level to ensure the changes are kept confidential from the users belonging to the lower security level.

In some situations, a problem may arise when a first user belonging to a lower security level releases a modified version of a document to a second user belonging to a higher security level because the modified version of the document may conflict with a version of the document that has been modified by the second user. That is, the problem is one of document change management, for example, keeping the changes that came from outside a higher security level (e,g., modifications made at a lower security level) organized with respect to those that came from inside the higher security level(and thus must be kept private). Thus, robust systems and methods for addressing the complexity of managing multiple documents shared between multiple security levels may be very desirable.

BRIEF DESCRIPTION OF THE DRAWINGS

Embodiments of the present invention will be readily understood by the following detailed description in conjunction with the accompanying drawings. To facilitate this description, like reference numerals designate like structural elements. Embodiments of the invention are illustrated by way of example and not by way of limitation in the figures of the accompanying drawings.

FIG. 8 illustrates the minimum number of storage devices needed for four security domains, in accordance with various embodiments of the present invention; and FIG. 9 illustrates the alternative minimum number of storage devices needed for four security domains, in accordance with various embodiments of the present invention;

DETAILED DESCRIPTION OF ILLUSTRATIVE EMBODIMENTS OF THE INVENTION

In the following detailed description, reference is made to the accompanying drawings which form a part hereof wherein like numerals designate like parts throughout, and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

Various operations may be described as multiple discrete operations in turn, in a manner that may be helpful in understanding embodiments of the present invention; however, the order of description should not be construed to imply that these operations are order dependent.

For the purposes of the instant description, the phrase "A/B" means A or B. For the purposes of the instant description, the phrase "A and/or B" means "(A), (B), or (A and B)." For the purposes of the instant description, the phrase "at least one of A, B and C" means "(A), (B), (C), (A and B), (A and C), (B and C) or (A, B and C)." For the purposes of the instant description, the phrase "(A)B" means "(B) or (AB)," that is, A is an optional element.

The description may use the phrases "in various embodiments," or "in some embodiments," which may each refer to one or more of the same or different embodiments. Furthermore, the terms "comprising," "including," "having," and the like, as used with respect to embodiments of the present invention, are synonymous.

In accordance with various embodiments of the present invention, novel methods and apparatuses are provided that allow users belonging to different "security domains" to have different degrees of access (e.g., view and/or edit) to an electronic document or versions of the electronic document (herein "document") while maintaining data separation between the security domains. As used herein, a security domain may be defined to be an administrative boundary, with users inside the boundary considered to be at a 'higher" security level than users outside of the boundary. In accordance with various embodiments of the present invention, a first user belonging to a security domain that is a higher security domain than a second security domain of a second user may have greater access rights to a document or versions of the document than the second user. These and other aspects of various embodiments of the present invention will be described in greater detail below.

Figure 1:
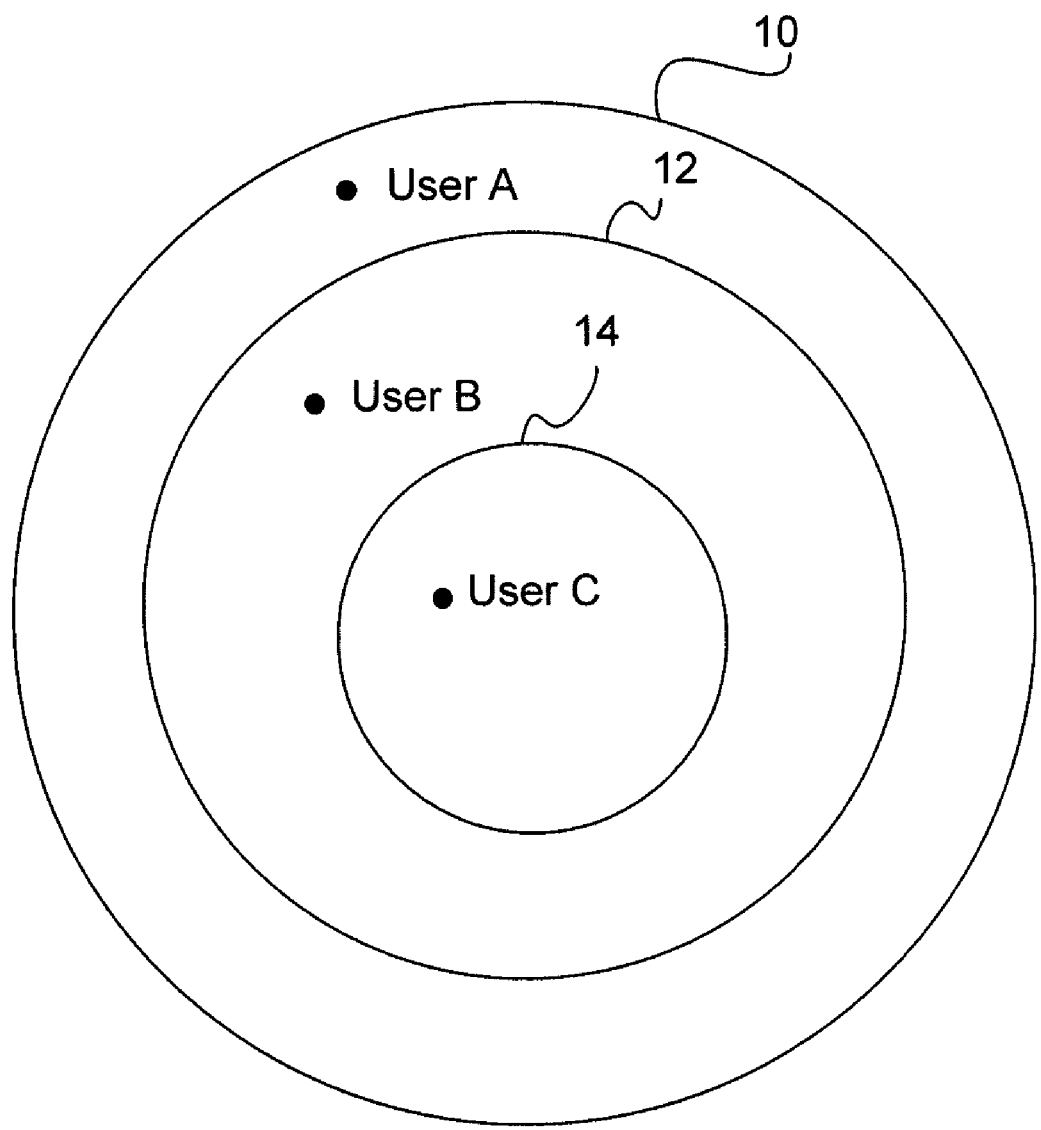
FIG. 1 illustrates exemplary relationships between three security domains, in accordance with various embodiments of the present invention.

FIG. 1 illustrates an exemplary relationship between three security domains in accordance with various embodiments of the present invention. For the embodiments, the outer most circle represents the security authority or scope of users of a first security domain 10, the intermediate circle represents the security authority or scope of users of a second security domain 12, and the inner most circle represents the security authority or scope of users of a third security domain 14. The first security domain 10 is a more restrictive higher security level domain typically having a smaller number of authorized users than second security domain 12, while the second security domain 12 is a less restrictive medium security level domain typically having a larger number of authorized users, but still more restrictive with higher security level than the third security domain 14 being least restrictive and having potentially the largest number of the authorized users. Users of the more restrictive higher security domain have authority or security clearance to access information accessible to users of less restrictive lower security domains. For example, users of first security domain 10 may access information accessible to users of all three security domains 10-14, users of security domain 12 may access information accessible to users of security domains 12-14, while users of security domain 14 may access information accessible through security domain 14. In this example illustration, user A belongs to the first security domain 10, user B belongs to the second security domain 12, and user C belongs to the third security domain 14. Thus, A may access what B and C can access, while B can access what C can access.

In accordance with various embodiments, those users belonging to a higher security domain may have greater access rights to information content of a document being shared between different security domains than those users belonging to lower security domains. A document, as used herein, may refer to any stored or streaming digitally represented data such as word processing document, a streaming media file such as an audio or video file, a sequence of sensor reading, a web page document, and so forth; of particular interest is a document with information content of different security levels to be viewable and/or editable by users of particular security levels and higher but not by users of lower security levels.

In various embodiments, users belonging to a higher security domain may have greater access rights to information content of a document. The greater access rights of users belonging to a higher security domain may include, for example, the ability to edit or modify information content of a document that may not be viewable and/or editable to users of lower security domains. On the other hand, edits or modifications made by users belonging to a lower security domain may be viewable and/or editable by users belonging to a higher security domain.

For example, suppose a document is being shared between the different security domains depicted in FIG. 1. If user A, who belongs to the first security domain 10 makes modifications to the document, then such modifications may or may not be viewable (and/or editable) by users B and C, who belong to lower security domains, depending upon whether the security level to be associated with these modifications. In contrast, modifications made by user B may be viewable and/or editable by user A, who belongs to a higher security domain. Further, such modifications made by user B may not be viewable and/or editable by user C since user C belongs to even a lower security domain.

The distinction between the different security domains, in accordance with various embodiments, may be made on user class basis. In other embodiments, it may be a per-document or groups of document basis, with the roles of "higher" and "lower" security domains assigned arbitrarily for any particular document. As will be described in more details below, these multiple "security views" of a document may be efficiently provided in accordance with various embodiments of the present invention. Before proceeding to further describe the present invention, it should be noted that the illustrated concentric nature of the relationship between the security domains is illustratively only. In alternate embodiments, the security relationship between the various security domains may be different including the security domains being mutually exclusive, i.e. users of the various security domains may have viewable and/or editable access rights to disjointed portions of the information content of a document.

Figure 2:
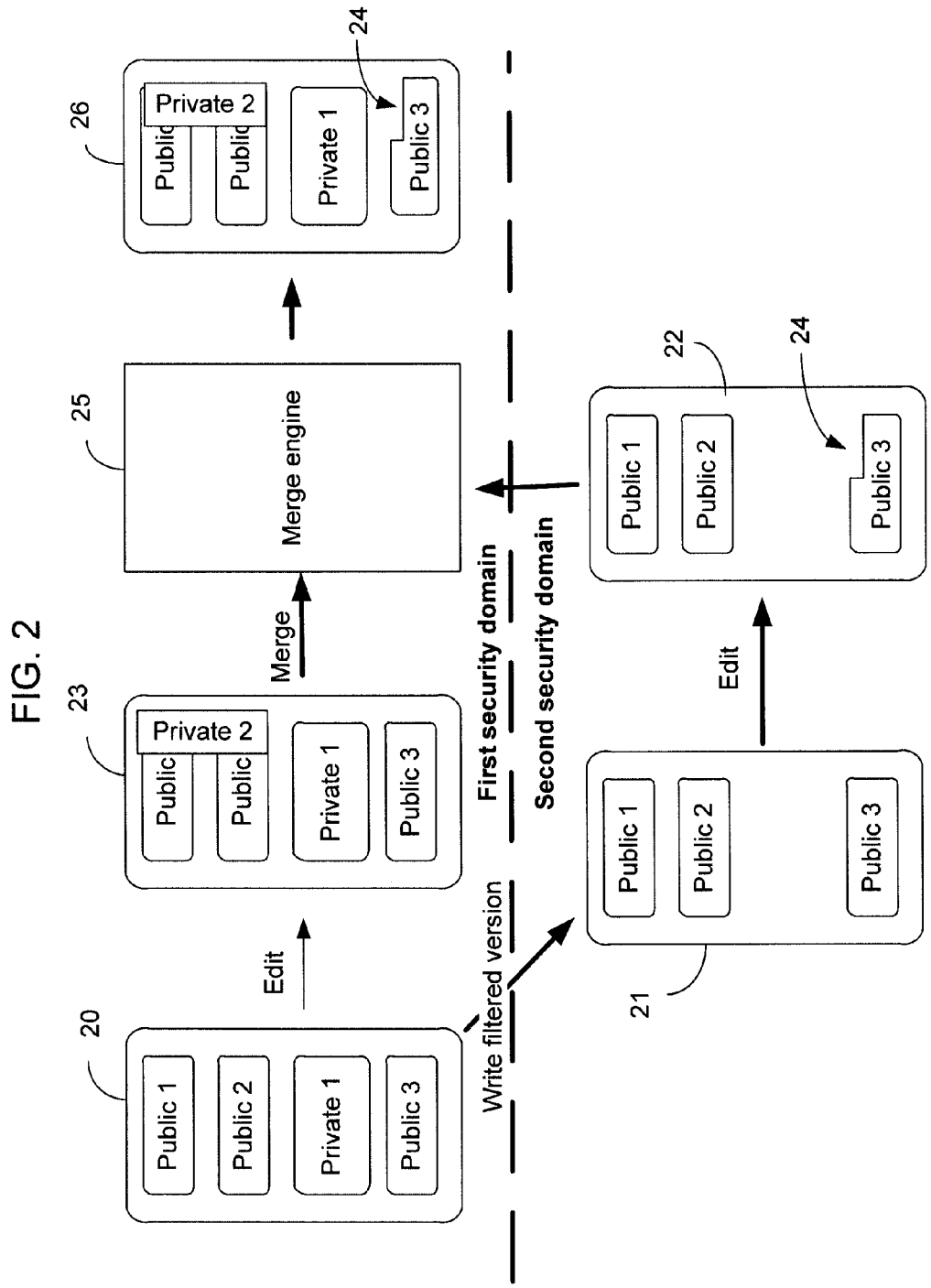
FIG. 2 illustrates the evolution of a document and a version of the document through two security domains, in accordance with various embodiments of the present invention.

To illustrate how a document may be accessed with different security views in a multi-security domain environment of FIG. 1, the following illustrative example is provided, which describes a document with content of at least two security levels being shared and modified in the simplest case, between two security domains. Referring now to FIG. 2, which illustrates the evolution of a document through two security domains, in accordance with various embodiments of the present invention. The two security domains include a first security domain and a second security domain, wherein the first security domain is a higher security domain than the second security domain.

The document 20, for the embodiments, may be initially created based on user input provided by a first user through the first security domain. The document 20 includes multiple components of different security attributes—three "public" components (depicted as public 1, public 2, and public 3) and one "private" component (depicted as private 1). The term "public" as used herein is to indicate that a component or at least a copy of the component having such a designation may be allowed to be published or written from a first security domain to a lower second security domain for viewing and/or editing by a user through the second security domain. In contrast, the term "private" as used herein is to indicate that a component or at least a copy of the component having such a designation may not be allowed to (i.e., should not) be published or written from the higher first security domain to the lower second security domain for viewing and/or editing by a user through the lower second security domain.

A component may simply be a part or a portion of the document 20. For example, if the document 20 is a word processing document, then a component may be a page, a paragraph, a sentence, an embedded image, an embedded audio, and so forth, of the word processing document. It should be noted that although in this example the document 20 is described as being initially created in the higher first security domain, in alternative embodiments, however, the document 20 may be initially created in the lower second security domain and then uploaded to the higher first security domain.

After the document 20 is created through the higher first security domain, the document 20 may be shared with the lower second security domain to the viewing and/or editing of the public components. As will be described in more detail below, embodiments of the invention advantageously support a publishing operation whereby a version 21 of the document 20 may be automatically saved (without or minimal user involvements) from a higher first security domain to a lower second security domain by automatically determining whether the document contains one or more components that are not to be (i.e., should not be) accessible through the lower second security domain (i.e., private components in this example), and then writing only the public components to the lower second security domain excluding the one or more private components determined not to be accessible through the lower security domain. This may be accomplished, for example, by filtering the document 21 to strip-out all of the private components (e.g., private 1) included in the document 20 before writing the remaining public components (version 21) to the lower second security domain.

In some embodiments of the present invention, after being published to the lower second security domain, the version 21 of the document 20 may be saved to a storage device, such as a database, associated with the lower security domain as will be described in greater detail herein. The version 21 may then be viewed and/or edited by modifying one or more of the components included in version 21 and/or by adding one or more new components to the version 21 based on input provided by a user or users having access to the version 21 through the lower second security domain.

If the document 20 (and the version 21 of the document 20) is a word processing document, and the components of the document are simply portions of the documents (e.g., paragraph, sentences, embedded media etc.), then a modification of a component may be, for example, the addition of text to the component or deletion of existing text in the component, or a newly added/deleted embedded media (image/audio). In this example, based on user input provided through the lower security domain, version 21 is edited by modifying the third public component (public 3). The modification of the third public component (public 3), in this case, is the deletion of a portion of the third public component (public 3) as depicted by 24. As a result of the modification to the third public component, a modified version 22 is logically produced. The modified version 22 may, in some embodiments, be physically produced and saved into a storage device associated with the second security domain (in addition to or in parallel with version 21).

While version 21 is being edited in the second security domain, the document 20 may also be edited based on input provided by a user or users having access to the document 20 through the first security domain. A user having access to the document 20 through the higher first security domain may edit the document 20 by providing user input to modify one or more existing components included in the document 20 and/or adding new components to the document 20. In this example, based on the user input provided through the higher first security domain, a new private component (private 2) is added to the document 20 to produce yet another revised version of document, version 23. Since the new component is a new private component (private 2), embodiments of the invention advantageously preclude the new private component from being written to the lower second security domain. However, if a new public component had instead been added to the document 21, embodiments of the invention advantageously facilitate automatic writing of the public component, via the earlier alluded to publishing operation, to the lower security domain (assuming the public component does not depend on on a private component). The concept of "dependency" and how it may determine whether a component or a modification can be published will be described in greater detail below.

Note that the new private component (private 2) is depicted as being on top of public components (public 1 and 2). This is to indicate that the new private component (private 2) is a component that depends on other components, in this case, two public components (public 1 and 2). At this point, it should be noted that each of the components included in version 21 as well as modified version 22 has a corresponding component (i.e., public 1, public 2, and public 3) included in the document 20 unless it is a new component added through the second security domain. Thus, in this example, document 20 (as well as the revised document 23) includes components that correspond with the components of the modified version 22 since no new components were added.

When a user having access to the higher security domain wishes to open the revised document 23, a merge engine 25 included in embodiments of the invention advantageously merge the revised document 23 with one or more of the components of the modified version 22 automatically to generate a merged document 26 that the user can then view and/or edit. However, prior to merging the revised document 23 with the one or more of the components included in the modified version 22, embodiments of the invention automatically perform a determination as to whether a version (e.g., version 21 or modified version 22) of the document 20 has indeed been saved to the lower security domain. If it is determined that a version (e.g., version 21 or modified version 22) of the revised document 23 has indeed been saved to the lower security domain then a further determination is automatically made to determine whether one or more components included in the saved version (e.g., modified version 22) have been modified through the lower security domain, or one or more new components have been added to the saved version (e.g., modified version 22) through the lower security domain. If so, then a copy of the one or more modified or new components from the lower security domain are automatically retrieved and merged with the revised document 23 being open at the higher security domain.

In some embodiments of the present invention, the merge engine 25 may call upon a "merge plugin," which may be a media-specific piece of software that may combine multiple components (either from the same or different security levels) to create a combined merged view of a document. In various embodiments, the "merge plugin" may be adapted to support merging components of different formats, structures, or media types. For example, text-based documents may be merged via a line-by-line merge, by applying textual patches, or by taking advantage of underlying structure, such as exists in an extensible markup language (XML) or hypertext markup language (HTML) document, and merge element nodes structurally, independent of their specific rendering into ASCII. Audio streams may be merged by mixing and slicing. Images may be merged via image overlays via image overlays, and videos merged via a combination of splicing and overlays.

Another task that may be performed (automatically or via user instructions) by the merge plugin is to resolve "conflicts." A conflict may occur when two components express modifications to the document that cannot be automatically reconciled. For example, suppose a first component (e.g., public 1 of document 20) included in document 20 of FIG. 2 is a corresponding component to a second component (e.g., public 1 of version 21) included in version 21 of the document 20. Suppose further that the first and the second components are each modified based on user inputs received through the first and the second security domain, respectively. Then a determination may be made during the merge operation to determine whether a conflict exists between the modification made to the first component and the modification made to the second component. If a conflict is determined to indeed exist between the modifications made to each of the first and the second components, then the conflict may be resolved, at least in part, by transmitting an inquiry to a user through the first security domain as to how the conflict should be resolved. In response to the inquiry, the user may provide through the first security domain an input that includes an acceptance of the modification made to the first component, an acceptance of the modification made to the second component, or an indication to at least discard the conflicting modifications made through the first and second security domains and data to facilitate creation of a new modification.

To further illustrate the above conflict problem and the method for resolving a conflict, suppose a user associated with the lower second security domain (i.e., low user) deletes some text in a component included in a lower version of a document, and suppose another user associated with a higher first security domain (i.e., high user) modifies the corresponding text included in a corresponding component of the document. A conflict may occur during the merging operation because these modifications were made to essentially the same text (i.e., to the corresponding text of the corresponding components). As a result, and in accordance various embodiments of the present invention, the high security domain user (who may be the only party able to see the conflict) may be asked, by the merge engine's plugin for the appropriate media, how to resolve the conflict. The options for resolving a conflict may be to: a) accept high security domain user's component; b) accept the low security domain user's component; or c) discard both and create and merge a new component. For "c", the high security domain user may be requested to manually merge the two conflicting components to create the new component.

Various approaches may be employed in order to assign or associate different security levels to components of a document, e.g., to indicate whether a component is a public component to be accessible for viewing and/or editing through either a higher or a lower security domain or a private component to be accessible for viewing and/or editing only through the higher security domain. In some embodiments of the present invention, each component of a document may be associated with at least one of alternative security attribute values (or simply "attribute values") that may determined whether each of the components will be allowed to be written from a higher security domain to a lower security domain as will be demonstrated below: In the previously described operation for saving a document (or at least a version of the document when there are more than two security domains) from a higher security domain to a lower security domain, the components of the document may be filtered based on the attribute values associated with each of the components to determine which of the components are not to be accessible through the lower security domain, and to exclude those components determined not to be accessible through the lower security domain. In some embodiments, such attribute values may be included in the metadata of the document or be expressed in a directory that may be remotely maintained from the document.

Figure 3:
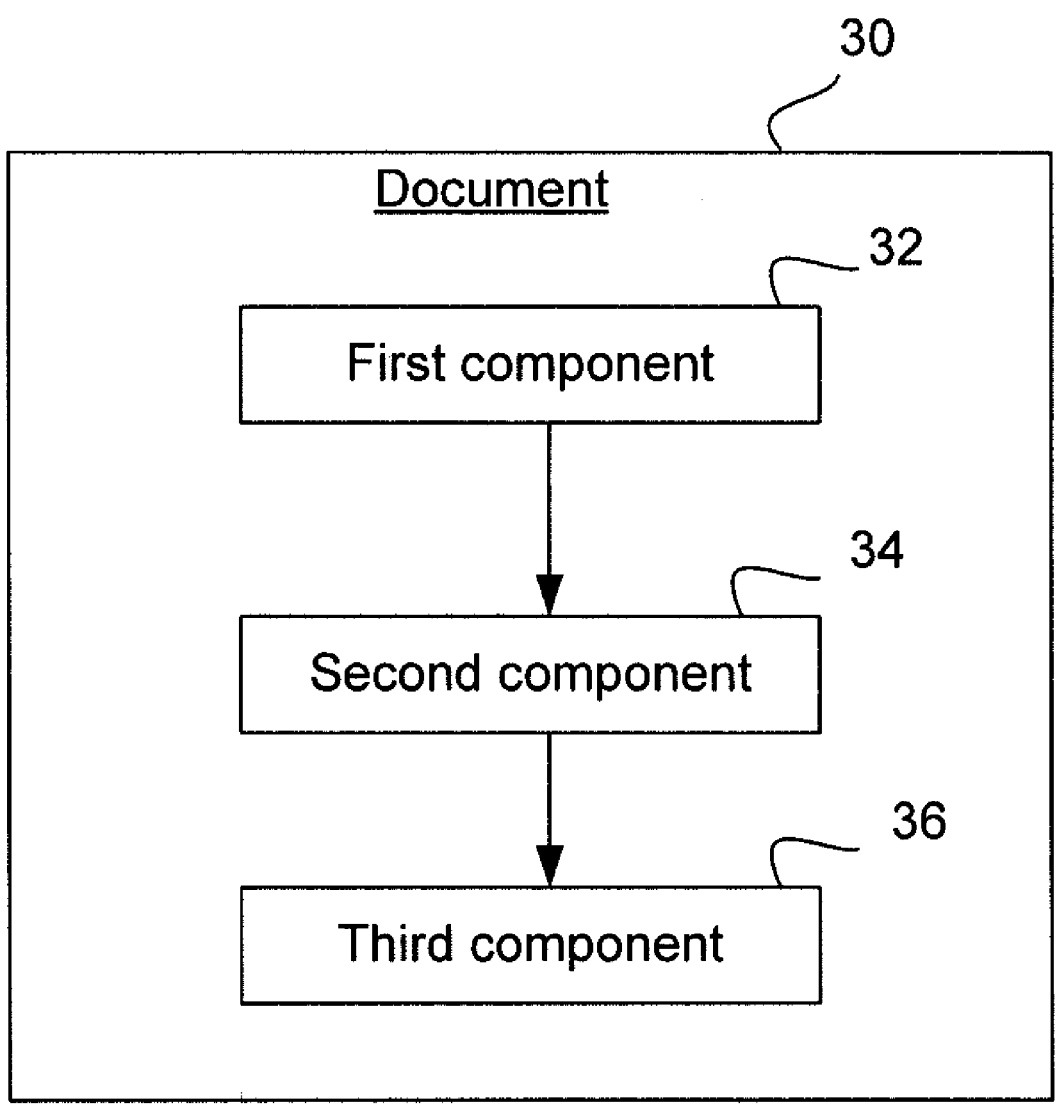
FIG. 3 illustrates an exemplary document containing a simple component structure, in accordance with various embodiments of the present invention.

A component of a document, in some instances, may be excluded from being saved or written from a higher security domain to a lower security domain even if the component is a public component. This may occur, for example, because the component may depend from a private component as briefly described previously and as will be illustrated by the following example. Referring to FIG. 3, which depicts an exemplary document containing a simple component structure in accordance with various embodiments of the present invention. As depicted, the document 30 includes three components, a first component 32, a second component 34, and a third component 36. In the depicted exemplary component structure, the third component 36 depends on the second component 34, and the second component 34 further depends on the first component 32. When components of a document have a dependent relationship with each other, a second type of a conflict issue may arise, which for purposes of illustration and clarity will be referred to herein as "a dependency issue" that may prevent the third component 36 from being written from the higher first security domain to the lower second security domain during a save operation even though the third component 36 may be a public component.

One class of dependency is interdependencies between text lines (or edited text lines). For example, in a program where a variable is introduced in line L1 and used in line L2. L2 is said to depend on L1. Another example is for XML documents, a section A may cross reference an image B, where image B is more classified (requiring higher level of security to access) than accessing section A in general without image B. Thus, by virtue of inclusion of image B, section A should be considered to have the same security classification as image B, once image B is added to section A. Further, dependency may also be semantic in nature. Different file formats may have different kinds of semantic and/or syntactic dependencies.

Each of the components 32, 34, and 36 may be associated with one of at least two alternative attribute values, a first and a second attribute value. The first attribute value may indicate that a component associated with the first attribute value is to be accessible for viewing and/or editing only through security domains that include a first security domain (i.e., higher security domain), but not a second security domain (i.e., lower security domain)—essentially making a component associated with the first attribute value a "private component." The second attribute value, in contrast, may indicate that a component associated with the second attribute value is to be accessible for viewing and/or editing through security domains that include both the first and the second security domains—essentially making a component associated with the second attribute a "public component." In various embodiment, explicit inheritance of security attribute values based on interdependency may be practiced. Note that although the previously described embodiments were directed to only two security domains, there may be more than two security domains in various alternative embodiments.

In any event, because of its dependency to the first and second components 32 and 34, the third component 36 may be excluded from being written from the first security domain to the second security domain if either of the first or the second component 32 or 34 is associated with the first attribute value even though the third component 36 may be associated with the second attribute value (i.e., the third component 36 is a public component). This is because if the third component 36 were to be written to the second security domain, it will likely not make sense to a user viewing the third component 36 through the second security domain if the user is unable to view the components that it depends from. This, in a nutshell, is an example of the dependency problem that was previously described.

As a result, in some embodiments of the present invention, during a save operation of the document 30 from a higher first security domain to a lower second security domain, a determination may be made as to whether the first or the second component 32 and 34 is associated with the first attribute value (i.e., is a private component), and if so, at least the third component 36 may be excluded from being written to the second security domain when writing the components of the document 30 into the second security domain regardless of whether the third component 36 is or is not associated with the second attribute value (i.e., public component). From another perspective, if the first component 32 is determined to be associated with the first attribute value, all three components 32, 34, and 36 may be excluded from being written to the second security domain. If the first component 32 is determined to be associated with the second attribute value (i.e., public component) but the second component is determined to be associated with the first attribute value (i.e., private component) then the first component 32 may be written to the second security domain but the second and third components 34 and 36 may be excluded from being written to the second security domain.

Although the above illustrated embodiments of the present invention were directed to situations where only two security domains are present, alterative embodiments of the present invention may be directed to situations where three, four, or more security domains are present. For example, in some embodiments of the present invention, a third security domain may be present in addition to the first two security domains whereby the third security domain is even a lower security domain than the second security domain. For these embodiments, in addition to saving version 21 of document 20 during a save operation to the second security domain, a second version of the document 20 may be saved to the third security domain. The saving of the second version of the document 20 to the third security domain may include, among other things, determining whether the document 20 contains one or more components that are not to be accessible through the third security domain, and writing components of the document 20 excluding the one or more components determined not to be accessible through the third security domain into the third security domain.

In contrast, when opening the document through the first security domain, a determination may be made as to, in addition to determining whether a version of the document has been saved to the second security domain, whether a second version of the document has been saved from the second security domain to the third security domain. And if the document (i.e., second version of the document) has been determined to have been saved to the third security domain, further determining whether one or more components of the second version of the document has been modified, or one or more new components has been added to the second version of the document through the third security domain. And if so, retrieve a copy of the one or more modified or new components from the third security domain, and merge the retrieved copy of the one or more modified or new components from the third security domain into the document being open at the first security domain.

Figure 4:
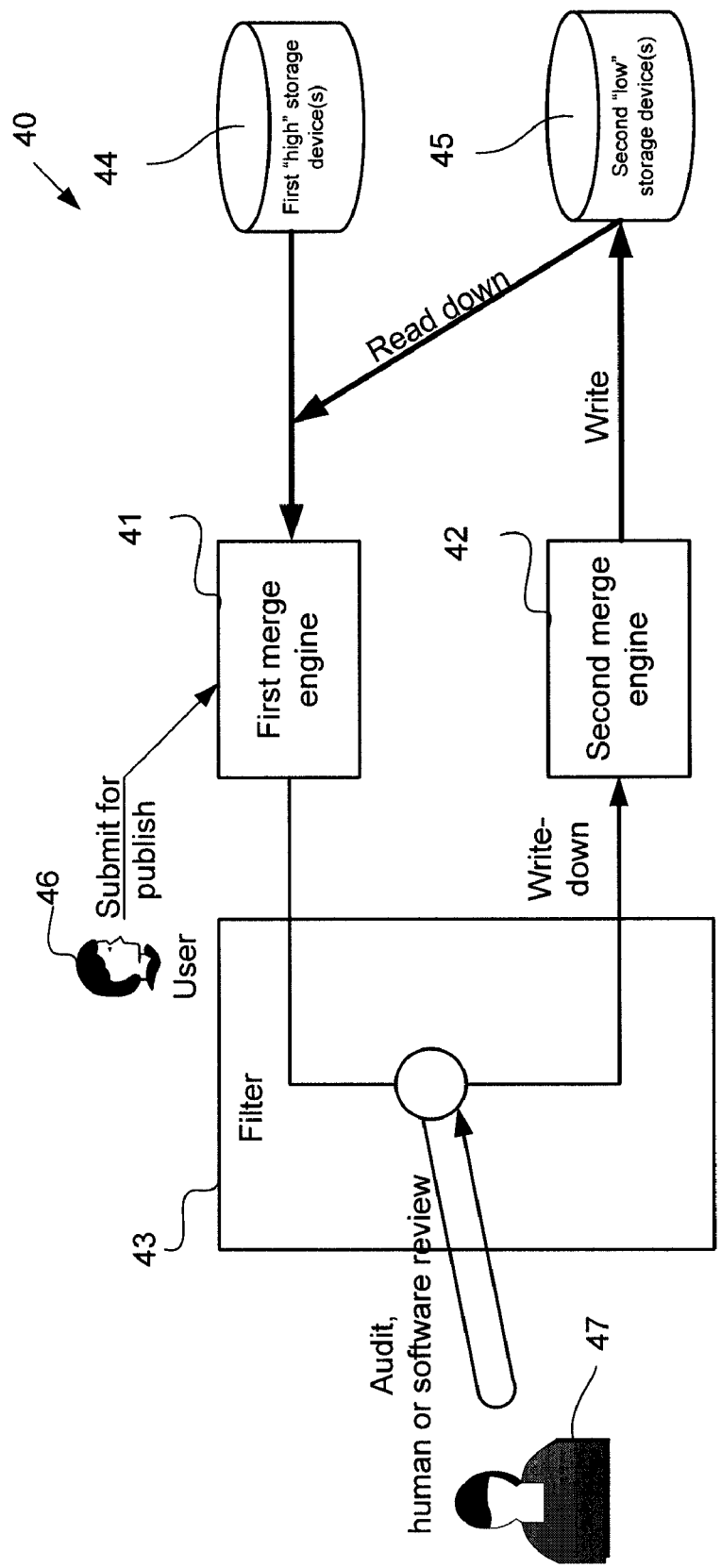
FIG. 4 illustrates an exemplary system, in accordance with various embodiments of the present invention.

FIG. 4 illustrates an exemplary system for publishing a document from a first security domain to a second security domain, the first security domain being a higher security domain than the second security domain, and for opening the document through the first security domain in accordance with various embodiments of the present invention. For the embodiments, a user 46 having access to the first security domain may, via the first security domain, create and submit to the system 40 a document for publishing to the second security domain. The document created may have annotations that specify that one or more components (i.e., public components) included in the document may be published to the second security domain. In some embodiments, the document after being created in the first security domain may be saved to and stored in a first one or more ("high") storage devices 44. A version of the document that does not include private components may then be published to the second security domain.

In order to publish a version of the document to the second security domain, a first ("high") merge engine 41 that is associated with the first security domain may filter the document to exclude or strip out private components that may be included in the document in order to form the version of the document to be saved to the second security domain. In some embodiments, this operation may be recorded to an audit log. The version of the document to be published to the second security domain may then be sent through a filter 43 for additional filtering to check for inappropriate data transmission. That is, the filter 43 may supplement the filtering or stripping operation performed by the high merge engine 41 to make sure that the version of the document to be published to the second security domain may not include data that should not be viewed by those users having access to the second security domain. Note that in alternative embodiments, the logging and/or the additional filtering operations may be eliminated.

The filter 41 may be a software and/or hardware implemented filter to detect inappropriate data that may be included in the version of the document to be published to the second security domain, and if such data is detected, to remove the inappropriate data. Alternatively, the filter 43 may be a manually performed filter in which case a third party 47, such as a system administrator, may be asked to check the version of the document to be published for any inappropriate data.

When a version of the document is published to the second security domain, the version of the document may then be received by a second (low) merge engine 42. In some embodiments, the low merge engine 42 may be used to facilitate modification of the components included in the version of the document saved to the second security domain and/or to add new components into the version of the document. The version of the document initially saved to the second security domain as well as subsequent versions of the document may be stored in a second one or more ("low") storage devices 45 associated with the second security domain.

When the document saved in the first one or more storage devices 44 is to be opened by a user 46 through the first security domain, the high merge engine 41 may retrieve the document from the first one or more storage devices 44. The high merge engine 41 may further read (i.e., read down) a version of the document stored in the second one or more storage devices 45, and merge the retrieved document with the version of the document read from the second security domain. Note that the document that is stored in the first one or more storage devices 44 may be a dynamic document that may be evolve over the course of time as it is modified by users through the first security domain.

In various embodiments, the merge and/or filter functions performed by the system 40 may be adapted to address the dependency problem previous described that may arise as a result of the dependencies of components. Recall that a public component may be prevented from being written from a first higher security domain to a second lower security domain if the component depends from a private component. Thus, in various embodiments, the first high merge engine 31 in order to resolve such problems, may be adapted to break the dependency of such a component by sending the entire "low view" of the document as one component. In other words, the version of the document to be published to a lower security domain may be sent as a single component document.

In some embodiments, the filtering operations (as well as the merging and the dependency resolution operations) described above may be media-specific. For example, if the document is a word processing document, a downgrading filter for a text document could filter text based on keywords, XML markup, ad-hoc ruleset, and so forth. On the other hand, if the document is an image file, than a downgrading filter for images could apply programmatic "blur" to reduce the image's detail, or it could add a black bar or selective pixilation to conceal the identity of an individual. If the document is a audio file, than a downgrading filter for audio could similarly down-sample the entire stream, or "bleep" specific segments.

Figure 5:
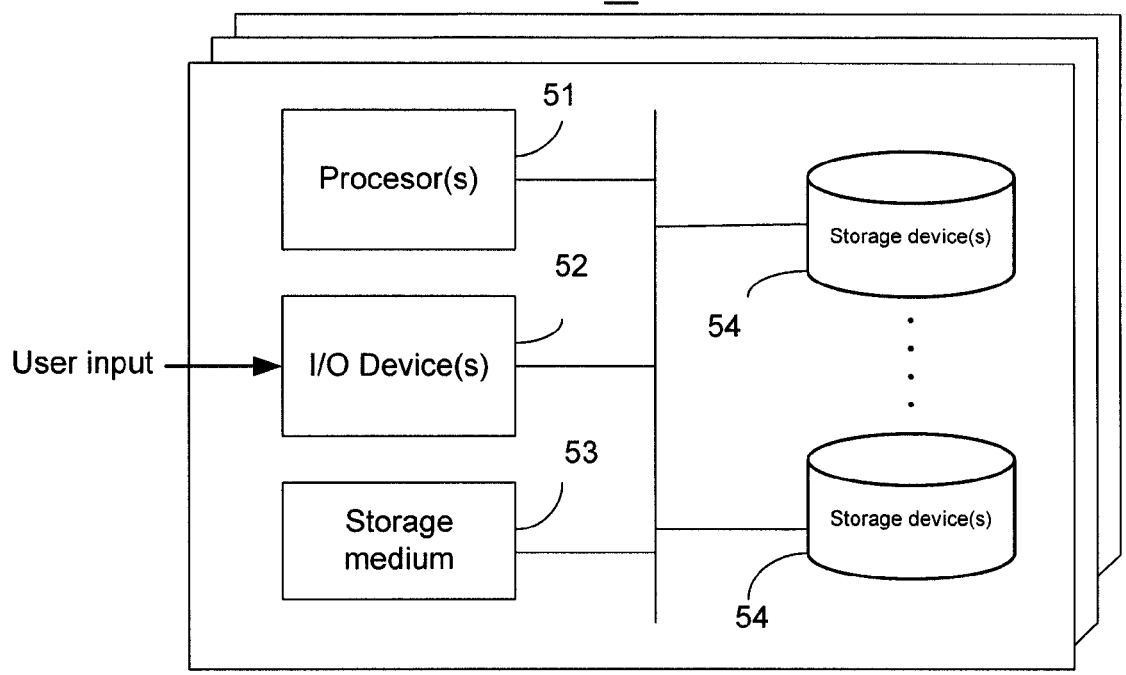
FIG. 5 illustrates an exemplary system for implementing various operations in accordance with various embodiments of the present invention.

FIG. 5 illustrates an exemplary system for implementing the operations previously discussed, in accordance with various embodiments of the present invention. For the embodiments, the system 40 may include one or more server devices designed to interface with one or more communication networks. In some embodiments, each of the communication networks may be associated with a corresponding security domain as will be further illustrated below with reference to FIG. 6. For these embodiments, a first one or more users belonging to a first security domain may communicate with the system 50 via a first communication network that may be dedicated to the first security domain while a second one or more users belonging to a second security domain may communicate with the system 50 via a second communication network that may be dedicated to the second security domain. In alternative embodiments, however, users belonging to different security domains may communicate with the system 50 through a common communication network.

The system 50 may include one or more processors 51, one or more input/output (I/O) devices 52, storage medium 53, and multiple sets of one or more storage devices 54, operationally coupled together as shown. Each set of one or more storage devices 54 may be for storing data that is accessible through a corresponding security domain. For example, a first set of one or more storage devices 54 may be for storing data to be accessed through a first security domain while a second set of one or more storage devices 54 may be for storing data to be accessed through a second security domain. The system 50 may further include one or more I/O devices 52 that may be one or more network interface cards (NICs) to facilitate communication through one or more communication networks.

The one or more processors 51, in brief, may operate according to programming instructions stored in the storage medium 53 to perform the previously described novel operations. In particular, the one or more processors 51 executing programming instructions stored in the storage medium 53 may save from a first security domain to a second security domain a version of a document, including determining whether the document contains one or more components that are not to be (i.e., should not be) accessible through the second security domain, wherein the first security domain being a higher security domain than the second security domain. After making such a determination, the one or more processors 51 may write the components of the document excluding the one or more components determined not to be accessible through the second security domain into the second security domain.

The one or more processors 51 may further open the document through the first security domain. In order to open the document, the one or more processors 51 may determine whether a version of the document has been saved to the second security domain. And if the version of the document is determined to have been saved to the second security domain, the one or more processors 51 may further determine whether one or more components of the version of the document has been modified, or one or more new components has been added to the version of the document through the second security domain. If is determined that the one or more components of the version of the document has been modified, or one or more new components has been added to the version of the document through the second security domain, then the one or more processors 51 may first retrieve a copy of the one or more modified or new components from the second security domain and then merge the retrieved copy of the one or more modified or new components into the document being open at the first security domain.

Figure 6:
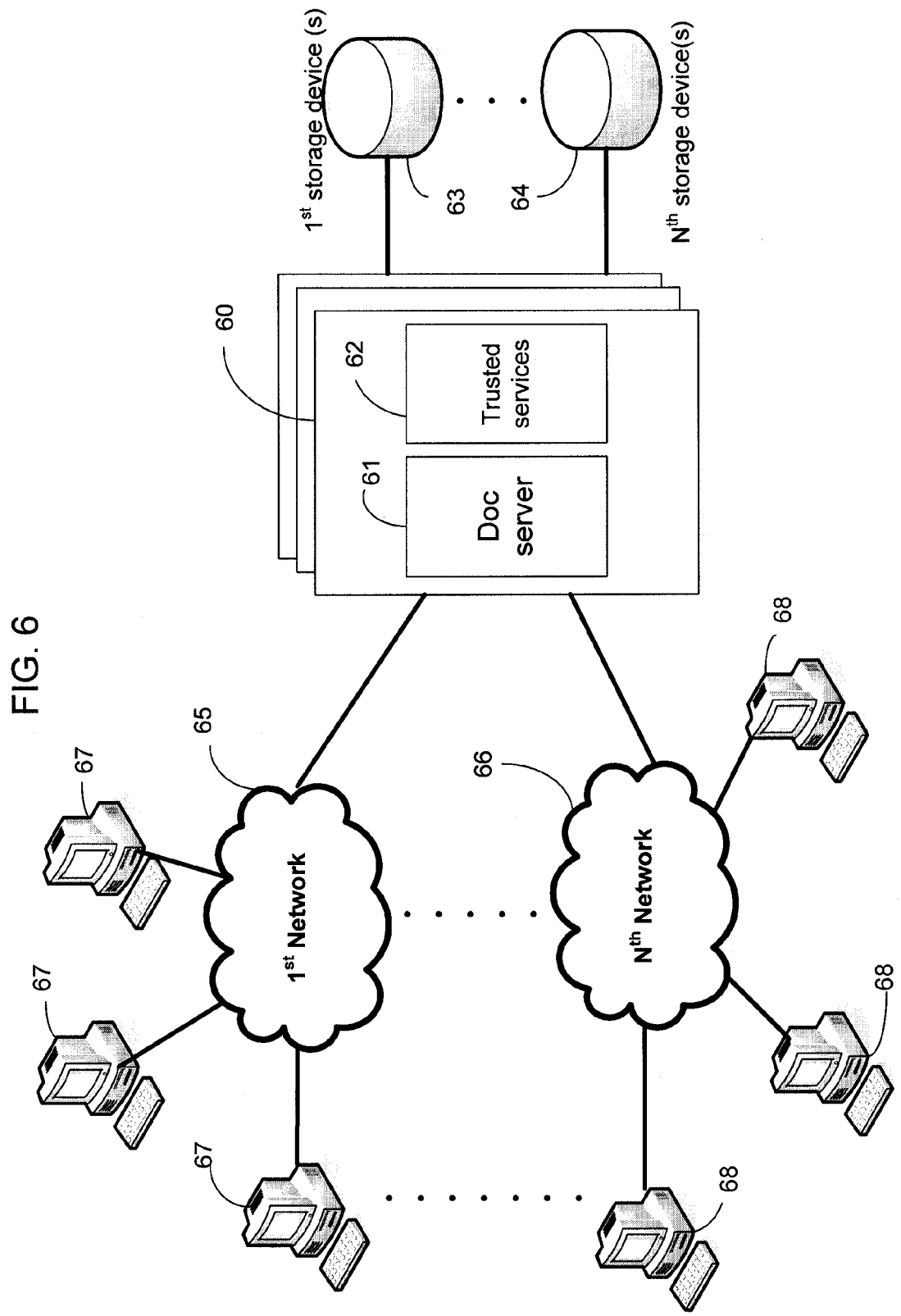
FIG. 6 illustrates an exemplary network system that communicates through one or more communication networks, in accordance with various embodiments of the present invention.

In some embodiments of the present invention, the programming instructions stored in the storage medium 53 may implement the above described functions of the present invention in the form of at least one document server engine and at least one trusted services engine to be operated by the one or more processors 51 as will be described herein. Referring to FIG. 6 illustrating an exemplary network system adapted to communicate with one or more communication network in accordance with various embodiments of the present invention. For the embodiments, the system 60 includes at least one document server engine 61 and at least one trusted services engine 62, coupled to a plurality of storage devices including a first one or more storage devices (first storage devices) 63 to an $N^{th}$ one or more storage devices ($N^{th}$ storage devices) 64. The system 60, in some embodiments, may comprise of a plurality of network server devices, each server device having at least a pair of document server engine and trusted services engine.

The first storage devices 63 to the $N^{th}$ storage devices 64 may each be associated with a corresponding security domain, from a first security domain to a $N^{th}$ security domain, respectively. Accordingly, data stored in the first storage devices 63 may be accessed by some users through the first security domain while data stored in the $N^{th}$ storage devices 64 may be accessed by the same or other users through the $N^{th}$ security domain. For example, the first storage devices 63 may store an electronic document while the $N^{th}$ storage devices 64 may store an $(N-1)^{th}$ version of the electronic document. The system 60 may further communicate with a plurality of communication networks from a first communication network 65 to an N$^{th}$ communication network 66.

Each of the communication networks 65 and 66 may be dedicated to a corresponding security domain. For example, the first communication network 65 may be dedicated to the first security domain while the N$^{th}$ communication network 66 may be dedicated to the N$^{th}$ security domain. Accordingly, some users may access the first storage devices 63 using a plurality of first client devices 67 that are linked to the first communication network 65 while some other users may access the N$^{th}$ storage devices 64 using a plurality of second client devices 68 that are linked to the N$^{th}$ communication network 66.

In various embodiments, the system 60 may be adapted to execute the open and save operations (as well as other associated operations) of a document and versions of the document in multiple security domains to include the publish and merge operations as previously described. For example, in some embodiments, the document server engine 61 and the trusted services engine 62 may cooperatively effectuate the publishing/saving of a version of a document from a first security domain to a second security domain, wherein the first security domain is a higher security domain than the second security domain. In various embodiments, doc server engine 61 is domain specific, that is, it is designed to serve only a security domain, whereas trusted service engine 62 is designed to service or cross multiple security domains, more specifically, the ability to access storage devices of the host or installed security domains and storage devices of security domains of lower security level. This cross domain access ability may be referred to as the "read down" ability. For these embodiments, each document server engine 61 may be adapted to interface with one or more of the first communication network 65 to the N$^{th}$ communication network 66 of a particular security classification to communicate with the client devices linked to those communication networks, while the trusted services engine 62 may interface with the first storage devices 63 to the N$^{th}$ storage devices 64 to selectively channel data to be published/saved to and retrieved from the first storage devices 63 to the N$^{th}$ storage devices 64. The architecture has the advantage of enabling the cross security domain component, i.e., trusted services engine 62, to be kept a relatively small component.

As briefly indicated earlier, in some embodiments, a document may be a web page. That is, and in accordance with various embodiments of the present invention, the above methods and apparatuses may be employed in order to, among other things, save at least a version of a web page from a first security domain to a second security domain, to open the web page through the first security domain, and to perform the various related operations described previously. In some embodiments, the web page may be a wiki web page with different portions of the wiki webpage being viewable and/or editable by users of different "security" domains.

Figure 7:
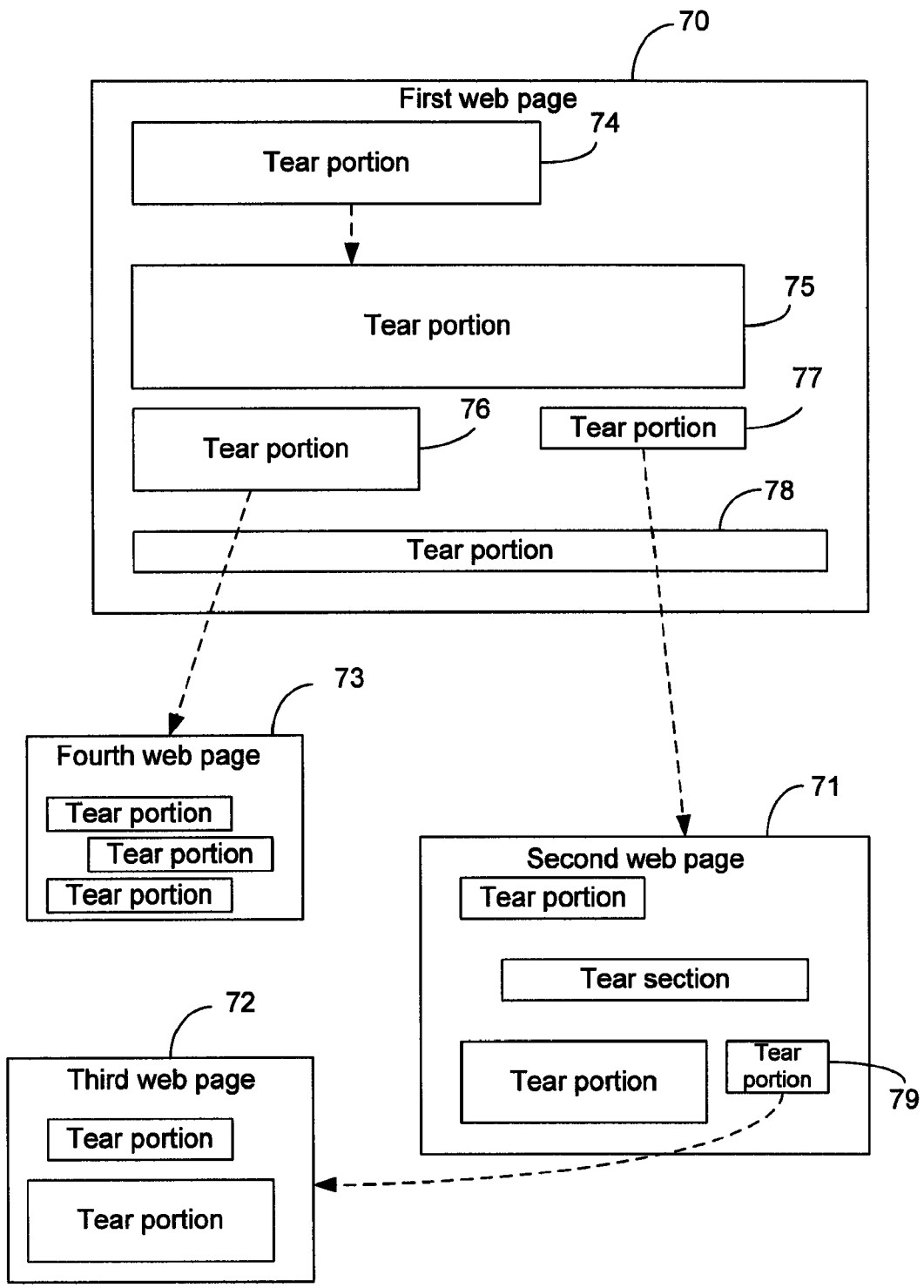
FIG. 7 illustrates web pages having multiple tear portions, in accordance with various embodiments of the present invention.

To demonstrate how the previously discussed methods and apparatuses may be employed in order to share a web page or versions of the web page between different security domains, FIG. 7 is provided which illustrates four exemplary web pages in accordance with various embodiments of the present invention. The web pages depicted include a first web page 70, a second web page 71, a third web page 72, and a fourth web page 73, each web page further comprising structured tear portions (herein "tear portions"). For example, the first web page 70 includes five tear portions 74, 75, 76, 77, and 78. The tear portions 74, 75, 76, 77, and 78 may merely be different sections of the web page 70 and are generally analogous to the document components discussed previously. The first web page 70 may be associated with the second, third, and fourth web pages 71, 72, and 73 via links such as uniform resource locator (URL) links. For example, tear portion 77 of the first web page 70 may include a link to the second web page 71 that associates the first web page 70 to the second web page 71, while a link included in tear portion 76 may associate the first web page 70 to the fourth web page 73. The second web page 71, as depicted, includes tear portion 79 that may further include a link to associate the second web page 71 to the third web page 72.

As an illustrative example, suppose that the first web page 70 is created through a first security domain. In order to allow users belonging to a second security domain (that is a lower security domain than the first security domain) to have at least limited access to the first web page 70 or at least a version of the first web page 70, a version of the first web page 70 may be saved from the first security domain to the second security domain. In some embodiments, the saving of the version of the first web page 70 to the second security domain may be implemented, at least in part, by a processor such as the one or more processors 51 of FIG. 5. The saving operation of the version of the first web page 70 may include determining whether the first web page 70 contains one or more tear portions not to be (i.e., should not be) accessible through the second security domain, and writing tear portions of the first web page 70 excluding the one or more tear portions determined not to be accessible through the second security domain into the second security domain. In other words, writing only non-excluded tear portions of the first web page 70 to the second security domain.

In contrast, when opening the first web page 70 in response to, for example, user input received through the first security domain, a determination may be made as to whether a version of the web page has been saved to the second security domain. And if the version of the first web page 70 is determined to have been saved to the second security domain, a further determination may be made as to whether one or more tear portions of the version of the first web page 70 saved in the second security domain has been modified, or one or more new tear portions has been added to the version of the first web page 70 saved in the second security domain. If it is determined that one or more tear portions of the version of the first web page 70 saved in the second security domain has been modified, or one or more new tear portions has been added to the version of the first web page 70 saved in the second security domain, then a copy of the one or more modified or new tear portions is or are retrieved from the second security domain. The retrieved copy of the one or more modified or new tear portions may then be merged into the first web page 70 being open at the first security domain.

In some embodiments of the present invention, a first tear portion of a web page may have a link linking the first tear portion to a second tear portion included in the same or a different web page. For example, tear portion 74 in FIG. 7 includes a link to link tear portion 74 to tear portion 75 as indicated by the dashed arrow line between tear portions 74 and 75. For these embodiments, if tear portion 74 is a non-excluded tear portion and tear portion 75 is an excluded tear portion, then the link to the excluded tear portion 75 included in the non-excluded tear portion 74 may be removed when writing tear portions of the first web page 70 into the second security domain. As a result, users having access to the version of the first web page 70 through the section security domain may be prevented from viewing the excluded tear portion 75 while still be able to access the non-excluded tear portion 75.

In the same or alternative embodiments of the present invention, web pages that are associated with the first web page 70 may also be written into the second security domain excluding those associated web pages that are directly or indirectly linked to only excluded tear portion(s). For example, suppose tear portion 77 is a non-excluded tear portion that may be written to the second security domain while tear portion 76 is an excluded tear portion that is excluded from being written to the second security domain. Under this scenario, the second web page 71 and the third web page 72, which are associated to the first web page 70 via the tear portion 77 may also be written to the second security domain unless, of course, the second web page 71 and/or third web page 72 are themselves excluded web pages in which case one or both of these web pages may be excluded from being written to the second security domain. Note that if only the third web page 72 is an excluded web page then only the third web page may be excluded from being written but if the second web page 71 is an excluded web page then both the second and third web pages 71 and 72 may be excluded from being written to the second security domain. In any event, the fourth web page 73 may also be excluded from being written to the second security domain since it is linked to excluded tear portion 76. It should also be further noted that, although not depicted, if the fourth web page 73 had been linked to both excluded tear section 76 and non-excluded tear section 77, then the fourth web page 73 may be written to the second security domain so long as it is itself not excluded from being written to the second security domain. This is because it would be linked to at least one non-excluded tear portion (i.e., tear portion 77).

In some embodiments, a user in the first security domain may be facilitated during the opening operation of the first web page 70 in deciding whether to accept or reject a modification to a tear portion of the first web page 70 made through the second security domain or a new tear portion added to the first web page 70 made through the second security domain. For these embodiments, a notification may be transmitted to the user for the user to accept or reject the modification of the tear portion or the addition of the new tear portion.

In some embodiments, additional modifications may be made through the second security domain to tear portions of web pages (e.g., second and third web pages 71 and 72) associated with the first web page 70, or new tear portions may be added through the second security domain to the web pages associated with the first web page 70 that are related to or correspond with the modification made to the tear portion of the first page 70 or the addition of the new tear portion to the first web page 70 made through the second security domain. When such additional modifications or additions to the associated web pages are made, they may be automatically accepted or rejected during the opening operation of the first web page 70 based upon the acceptance or rejection of the modification made to the tear portion of the first web page 70 or the addition of the new tear portion to the first web page 70.

Alternatively or in the same embodiments, links may be added to tear portions of the first web page 70 or the web pages associated with the first web page 70 that are related to or correspond with the modification made through the second security domain to the tear portion of the first web page 70 or the addition through the second security domain of the new tear portion to the first web page 70. When such links are added, they may be automatically accepted or rejected during the opening operation of the first web page 70 based upon the acceptance or rejection of the modification made through the second security domain to the tear portion of the first web page 70 or the addition through the second security domain of the new tear portion to the first web page 70

Referring to FIG. 8, which illustrates the number of storage devices that may be needed for four security domains in order to minimize or reduce data contention in accordance with various embodiments. In some embodiments, the storage devices 80, 81, 82, 83, 84, 85, 86, 87, 88, and 89 may be Direct Access Storage Devices (DASD). The four security domains depicted are a high security domain (H), a medium security domain (M), a low security domain (L), and a very low security domain (VL). For this example, the high security domain represents the highest security domain of the four security domains depicted, the medium security domain represents the second highest security domain, and so forth.

To enforce multi-level information separation, it may be generally desirable to, for any given security domain, separately maintain data received from other security domains. Thus, one approach is to have, for each security domain, shadow storage devices that stores separately data provided by the other security domains. For example, in FIG. 8 four storage devices 80, 81, 82, and 83 are employed by the high security domain, a storage device 80 for storing data of the high security domain, and three shadow storage devices 81, 82, and 83, for storing data provided by the medium, low and very low security domains. The data included in the three shadow storage devices 81, 82, and 83 of the high security domain may "shadow" the data that are stored in the storage devices 84, 87, and 89 of the medium, low, and very low security domains, respectively. The three shadow storage devices 81, 82, and 83 may be updated on a periodic or continuous basis, whenever storage devices 84, 87, and 89 themselves are updated. Typically, files or databases in storage devices 84, 87 and 89 are closed (preventing further updates from their respective security domains), when storage devices 81-83 are updated to shadow the respective storage devices 84, 87 and 89. As applied to the previous illustrations, if a document is created in the high security domain, then the document may be stored in storage device 80 while the three shadow storage devices 81, 82, and 83 for the high security domain may store three versions of the document from the other three security domains.

With respect to the medium security domain, only three storage devices 84, 85, and 86 may be employed. One storage device 84 for storing medium security domain data (data published into, modified and/or created in the medium security domain), and two shadow storage devices 85 and 86 for storing data from the two lower security domains (i.e., low and very low security domains). Similarly, files or databases in storage devices 87 and 89 are closed (preventing further updates from their respective security domains), when storage devices 85-86 are updated to shadow the respective storage devices 87 and 89. With respect to the low security level, only two storage devices 87 and 88 may be needed, a storage device 87 for storing low security domain data (data published into, modified and/or created in the low security domain), and a shadow storage device 88 for storing data from the very low security domain. Likewise, files or databases in storage devices 89 are closed (preventing further updates from its security domain), when storage device 88 is updated to shadow storage device 89. The very low security domain will include only a single storage device for storing very low security domain data (data published into, modified and/or created in the very low security domain). As a result, a minimum of ten storage devices are needed for four security domains to minimize data contention and when resources are limitless.

As can be seen, the above described approach for data separation in a multi-security level environment requires large numbers of storage device particularly for large numbers of security domains, which may significantly increase costs. Accordingly, the methods and apparatuses earlier described including the saving and merging operations may be leveraged in order to reduce the number of storage devices needed to enforce multi-level information separation without significantly sacrificing data contention. Referring to FIG. 9 illustrating the reduced number of storage devices that may be needed for four security domains when the previously described embodiments including cross domain trusted service engine 62 are practiced, in accordance with various embodiments of the present invention. For the embodiments, only seven storage devices 90, 91, 92, 93, 94, 95, and 96 are employed in order to maintain data separation for the four security domains instead of the ten needed by the previously described approach. The number of storage devices needed may be in accordance with the equation (2*m)−1, where m>1 and is equal to the number of security domains.

By employing, for example, the merging operations previously described in order to pull data from a lower security domain to a higher security domain, the overall number of storage devices needed in order to maintain data separation may be reduced. In this case, each of the security domains depicted will have two storage device with the exception of the highest security domain (i.e., high security domain) which only has a single storage device 90. Each of the lower security domains (i.e., medium, low, and very low) will have one "original" storage device and one "modification" storage device, with the former employed to store the data published/saved into a security level domain from higher security level domains, and the latter employed to store modifications made at the security level domain. Thus, for example, the medium security domain may include an original storage device 91, which store the data published/saved from the high security domain and a modification storage device 92, which will store modifications may via the medium security level domain. Each of the original and modification storage devices 92, 94, and 96 of the medium, low, and very low security domains may be used similarly by the other security domains.

To illustrate how the storage devices depicted may be used, suppose a document stored in the storage device 90 of the high security domain is to be open. During the merge operation, data from the storage devices 92, 94, and 96 may be retrieved to be merged with the document retrieved from the high storage device 90. The data retrieved, in this example, will be copies of the versions of the document saved in the medium, low, and very low security domains.

Before concluding the description, it should be noted that each of the storage device illustrated in FIG. 8 and 9 may be a partition of a storage device or a cluster of plurality of storage devices, and the storage devices may be electronic and/or optical storage devices, volatile or non-volatile.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope of the present invention. Those with skill in the art will readily appreciate that embodiments in accordance with the present invention may be implemented in a very wide variety of ways. This application is intended to cover any adaptations or variations of the embodiments discussed herein. Therefore, it is manifestly intended that embodiments in accordance with the present invention be limited only by the claims and the equivalents thereof.

What is claimed is:

1. A processor implemented method, comprising:
saving by the processor from a first security domain to a second security domain a version of a document, including determining that the document contains one or more components not to be accessible through the second security domain, and writing components of the document excluding the one or more components determined not to be accessible through the second security domain into the second security domain, the first security domain being a higher security domain than the second security domain;
opening by the processor through the first security domain the document;
determining by the processor that a version of the document has been saved to the second security domain;
determining by the processor that one or more components of the version of the document has been modified, or one or more new components have been added to the version of the document through the second security domain;
retrieving by the processor a copy of the one or more modified or new components from the second security domain, and merging the retrieved copy of the one or more modified or new components into the document being opened at the first security domain;
modifying by the processor, in response to user input received through the first security domain, a first component included in the document; and
modifying by the processor, in response to user input received through the second security domain, a second component included in the version of the document saved to the second security domain.

2. The method of claim 1, wherein said merging of one or more new components into the document comprises adding the one or more new components into the document.

3. The method of claim 1, wherein said second component included in the version of the document corresponds to the first component included in the document, and said merging of the retrieved copy of the one or more modified components comprises:
determining by the processor that the modification made to the second component through the second security domain conflicts with the modification made to the first component through the first security domain; and
resolving at least in part the conflict by the processor transmitting to a user through the first security domain an inquiry as to how the conflict should be resolved.

4. The method of claim 3, wherein said resolving at least in part the conflict by the processor comprises receiving by the processor, in response to said inquiry, user input through the first security domain that includes, for the conflict, an acceptance of the modification made to the second component through the second security domain, an acceptance of the modification made to the first component through the first security domain, or an indication to at least discard the conflicting modifications made through the first and second security domains and data to facilitate creation of a new modification.

5. The method of claim 1, wherein said opening by the processor through the first security domain of the document comprises reading the document from first one or more storage devices associated with the first security domain and said retrieving of the one or more modified or new components from the version of the document comprises reading the one or more modified or new components from second one or more storage devices associated with the second security domain.

6. The method of claim 1, wherein said document includes a first, a second, and a third component that are each associated with one of at least two alternative attribute values, a first attribute value indicating that a component associated with the first attribute value is to be accessible for viewing and/or editing only through security domains that include the first security domain, but not the second security domain, and a second attribute value indicating that a component associated with the second attribute value is to be accessible for viewing and/or editing through security domains that include both the first and the second security domains, the third component being dependent on the second component, which is in turn dependent on the first component, and said saving comprises:
  determining by the processor that the first or the second component is associated with the first attribute value; and
  writing components of the document, excluding at least the third component, into the second security domain.

7. The method of claim 1, further comprising:
  saving by the processor from the second security domain to a third security domain another version of the document, including determining that the document contains one or more components not to be accessible through the third security domain, and writing components of the documents excluding the one or more components determined not to be accessible through the third security domain into the third security domain, the second security domain being a higher security domain than the third security domain; and
  wherein said opening by the processor through the first security domain the document further comprises:
    determining that another version of the document has been saved from the second security domain to the third security domain;
    determining that one or more components of the other version of the document has been modified, or one or more new components has been added to the other version of the document through the third security domain;
    retrieving a copy of the one or more modified or new components from the third security domain; and
    merging the retrieved copy of the one or more modified or new components from the third security domain into the document being open at the first security domain.

8. The method of claim 1, wherein said saving by the processor from a first security domain to a second security domain a version of a document comprises saving from a first security domain to a second security domain a version of a word processing document, a streaming media file, a sequence of sensor readings, or a web page document.

9. The method of claim 1, further comprising providing by the processor in response to a user input received through the first security domain a document having a plurality of components, each of the components being associated with one of at least two alternative attribute values, a first attribute value indicating that a component associated with the first attribute value is to be accessible for viewing and/or editing only through security domains comprising the first security domain and not the second security domain and a second attribute value indicating that a component associated with the second attribute value is to be accessible for viewing and/or editing through security domains comprising both the first and the second security domains.

10. The method of claim 9, wherein said writing components of the document excluding the one or more determined not to be accessible through the second security domain comprises filtering the components of the document based on the attribute values associated with components to determine which of the components are not to be accessible through the second security domain, and to exclude those determined not to be accessible through the second security domain to be written into the second security domain.

11. An apparatus, comprising:
  one or more processors;
  storage medium coupled to the processors having stored therein programming instructions to be operated by the one or more processors to:
    save from a first security domain to a second security domain a version of a document, including determining that the document contains one or more components not to be accessible through the second security domain, and writing components of the document excluding the one or more components determined not to be accessible through the second security domain into the second security domain, the first security domain being a higher security domain than the second security domain;
    open through the first security domain the document;
    determine that a version of the document has been saved to the second security domain;
    determine that one or more components of the version of the document has been modified, or one or more new components has been added to the version of the document through the second security domain;
    retrieve a copy of the one or more modified or new components from the second security domain;
    merge the retrieved copy of the one or more modified or new components into the document being open at the first security domain;
    modify, in response to user input received through the first security domain, a first component included in the document; and
    modify, in response to user input received through the second security domain, a second component included in the version of the document saved to the second security domain.

12. The apparatus of claim 11, further comprising a first and a second one or more storage devices operationally coupled to the one or more processors to store data to be accessed through the first and the security domain, respectively, the first storage device to store the document and the second storage device to store the version of the document.

13. The apparatus of claim 12, wherein the programming instructions are adapted to be operated by the one or more processor to save from the second security domain to a third security domain another version of the document, including determining that the document contains one or more components not to be accessible through the third security domain, and writing components of the documents excluding the one or more components determined not to be accessible through the third security domain into the third security domain, the second security domain being a higher security domain than the security domain; and
  wherein said opening through the first security domain the document includes:
    determining that another version of the document has been saved to the third security domain;
    determining that one or more components of the other version of the document has been modified, or one or more new components has been added to the other version of the document through the third security domain;

retrieving a copy of the one or more modified or new components from the third security domain; and merging the retrieved copy of the one or more modified or new components from the third security domain into the document being open at the first security domain.

14. The apparatus of claim 13, further comprising a third one or more storage device operationally coupled to the one or more processors to store data to be accessed through the third security domain, the third storage device to store the other version of the document.

15. The apparatus of claim 12, wherein the programming instructions implement a security domain specific document server engine and a cross security domain trusted services engine to be operated by the one or more processors to cooperatively effectuate said save from the first security domain to the second security domain the version of the document and said open through the first security domain the document.

16. The apparatus of claim 15, wherein said document server engine is adapted to be first instantiated to interface with one or more communication networks to communicate with a first client device having access to the first security domain, and to be second instantiated to communicate with a second client device having access to the second security domain, via the one or more communication networks.

17. The apparatus of claim 15, wherein said trusted service engine is adapted to interface with the first and the second one or more storage devices to selectively channel data to be saved to and retrieved from the first and the second one or more storage devices.

18. An article of manufacture, comprising:
a non-transitory storage medium;
a plurality of programming instructions stored in the storage medium to program an apparatus to enable to the apparatus to;
save from a first security domain to a second security domain a version of a document, including determining that the document contains one or more components not to be accessible through the second security domain, and writing components of the document excluding the one or more components determined not to be accessible through the second security domain into the second security domain, the first security domain being a higher security domain than the second security domain;
open through the first security domain the document;
determine that a version of the document has been saved to the second security domain;
determine that one or more components of the version of the document has been modified, or one or more new components have been added to the version of the document through the second security domain;
retrieve a copy of the one or more modified or new components from the second security domain;
merge the retrieved copy of the one or more modified or new components into the document being open at the first security domain;
modify, in response to user input received through the first security domain, a first component included in the document; and
modify, in response to user input received through the second security domain, a second component included in the version of the document saved to the second security domain.

19. The article of claim 18, wherein said programming instructions are adapted to add the one or more new components into the document, when performing said merging of one or more new components into the document.

20. The article of claim 18, wherein said programming instructions are further adapted to perform said open through the first security domain of the document by reading the document from first one or more storage devices associated with the first security domain, and said retrieve of the one or more modified or new components from the version of the document by reading the one or more modified or new components from second one or more storage devices associated with the second security domain.

21. The article of claim 18, wherein said document includes a first, a second, and a third component that are each associated with one of at least two alternative attribute values, a first attribute value indicating that a component associated with the first attribute value is to be accessible for viewing and/or editing only through security domains that include the first security domain, but not the second security domain, and a second attribute value indicating that a component associated with the second attribute value is to be accessible for viewing and/or editing through security domains that include both the first and the second security domains, the third component being dependent on the second component, which is in turn dependent on the first component, and said programming instructions are further adapted to perform said saving including:
determining that the first or the second component is associated with the first attribute value; and
writing components of the document, excluding at least the third component, into the second security domain.

22. The article of claim 18, said programming instructions are further adapted to save from the second security domain to a third security domain another version of the document, including determining that the document contains one or more components not to be accessible through the third security domain, and writing components of the documents excluding the one or more components determined not to be accessible through the third security domain into the third security domain, the second security domain being a higher security domain than the third security domain; and
wherein said opening through the first security domain the document further comprises:
determining that another version of the document has been saved from the second security domain to the third security domain;
determining that one or more components of the other version of the document has been modified, or one or more new components has been added to the other version of the document through the third security domain; and
retrieving a copy of the one or more modified or new components from the third security domain, and merging the retrieved copy of the one or more modified or new components from the third security domain into the document being open at the first security domain.

23. The article of claim 18, wherein said programming instructions are adapted to save from a first security domain to a second security domain a version of a word processing document, a streaming media file, a sequence of sensor readings, or a web page document.

24. The article of claim 18, wherein said programming instructions are further adapted to provide in response to a user input received through the first security domain a document having a plurality of components, each of the components being associated with one of at least two alternative attribute values, a first attribute value indicating that a component associated with the first attribute value is to be accessible for viewing and/or editing only through security domains comprising the first security domain and not the second security domain and a second attribute value indicating that a component associated with the second attribute value is to be accessible for viewing and/or editing through security domains comprising both the first and the second security domains.

* * * * *